(12) United States Patent
Schmitt

(10) Patent No.: US 7,053,332 B2
(45) Date of Patent: May 30, 2006

(54) SHORT-CYCLE ARC WELDING SYSTEM AND METHOD

(75) Inventor: Klaus G. Schmitt, Giessen (DE)

(73) Assignee: Newfrey LLC, Newark, DE (US)

( * ) Notice: Subject to any disclaimer, the term of this patent is extended or adjusted under 35 U.S.C. 154(b) by 4 days.

(21) Appl. No.: 10/783,980

(22) Filed: Feb. 20, 2004

(65) Prior Publication Data

US 2004/0200808 A1 Oct. 14, 2004

Related U.S. Application Data

(63) Continuation of application No. PCT/EP02/09760, filed on Sep. 2, 2002.

(30) Foreign Application Priority Data

Sep. 3, 2001 (DE) ................................ 101 44 256

(51) Int. Cl.
*B23K 9/20* (2006.01)
(52) U.S. Cl. ......................................................... 219/98
(58) Field of Classification Search .................. 219/98, 219/99

See application file for complete search history.

(56) References Cited

U.S. PATENT DOCUMENTS

| 4,267,425 A | * | 5/1981 | Kondo ......................... 219/98 |
| 4,441,007 A | * | 4/1984 | Jordan ......................... 219/98 |
| 4,567,344 A | * | 1/1986 | Michalski, Jr. ............... 219/98 |
| 6,011,234 A | * | 1/2000 | Kirchner et al. .............. 219/98 |

FOREIGN PATENT DOCUMENTS

| EP | 1123769 | 8/2001 |
| GB | 2092044 | 8/1982 |
| WO | WO 9605015 | 2/1996 |
| WO | WO 9611767 | 4/1998 |

OTHER PUBLICATIONS

International Search Report for PCT/EP02/09760, dated Dec. 6, 2002, 3 pages.
Neue Tucker Technologie. Bolzenschweiβen mit Systeml; dated Sep. 1999 (Brochure in German with translation brochure attached).

* cited by examiner

*Primary Examiner*—Clifford C. Shaw
(74) *Attorney, Agent, or Firm*—Harness, Dickey & Pierce, P.L.C.

(57) ABSTRACT

The invention relates to a short-cycle arc welding system comprising a robot having at least one arm which can be displaced in at least one coordinate axis (x, y, z), a welding head which is positioned on the arm and on which a holding device or holding an element and a lifting device are provided, said lifting device moving the holding device back and forth in relation to the welding head and a measuring system for determining the relative position between a component and an element which is held by the holding device and is to be welded to the component. Said measuring system comprises a foot which is mounted on the welding head and which is embodied in such a way that, during operation, it is in contact with the component in order to determine the relative position between the element and the component.

29 Claims, 2 Drawing Sheets

SHORT-CYCLE ARC WELDING SYSTEM AND METHOD

CROSS-REFERENCE TO RELATED APPLICATIONS

This application is a continuation of PCT application PCT/EP02/09760, filed on Sep. 2, 2002, which claims priority to German application no. DE 101 44 256.4, filed on Sep. 3, 2001, both of which are incorporated by reference herein.

BACKGROUND AND SUMMARY OF THE INVENTION

The present invention relates to a short-cycle arc welding system for welding elements, such as metal studs, to components, such as metal sheets, having:
  a robot that has at least one arm that can move in at least one coordinate axis
  a welding head that is mounted on the arm and on which is provided a holder for holding an element and a linear motion device for advancing and retracting the holder relative to the welding head, and
  a measurement system for determining the relative position of a component to an element to be welded to the component and held by the holder, wherein the measurement system has a foot mounted on the welding head that is designed to contact the component during operation in order to determine the relative position of the element to the component.

The present invention also relates to a corresponding method for short-cycle arc welding. Such a short-cycle arc welding system and an associated method are generally known. In short-cycle arc welding, an element is welded onto a component. In this process, an arc that melts the end faces is formed between the element and the component. The element and component are then moved toward one another so that the molten materials combine. The arc is short-circuited and all the molten material solidifies. It is customary for the arc to be drawn. In this process, the element is first placed in contact with the component. A pilot current is then switched on and the element is raised to a desired height above the component, drawing an arc. Only then is the welding current switched on.

To achieve consistently good welding results, it is important to know the relative positions of the element and component, and in particular to raise the element to the correct height before the welding current is switched on. To this end, a measurement of the relative position is generally performed before each welding operation, particularly in the form of a determination of the zero point. This is especially important in robot-based systems. It is true that modern robots generally are able to position relatively precisely. However, due to the large moving masses, high precision cannot be achieved with very high speeds. The robots customarily have a range of motion in three coordinates. In the simplest case, a robot is an automatically operated linear guide (carriage) on which is mounted a welding head.

Stud welding systems are used in the automotive industry in particular, where they are used primarily to weld elements such as threaded and unthreaded studs, eyes, nuts, etc. to the car body sheet metal. These elements are then used as anchors for attaching such items as interior paneling and trim. Speed of production is a critical factor in the automotive industry. Hundreds of elements must be automatically welded to different positions by robots within a space of just a few minutes. Consequently, the robots must be moved at high speeds. Accordingly, it is known to affix to the arm of a robot a welding head base that supports a carriage. The carriage is capable of moving at high speeds with high precision, typically by means of a pneumatic or hydraulic system. Mounted on the carriage is the actual welding head, which in turn has a linear motion device for moving the element.

It is known to affix a so-called support foot to the welding head in order to determine the relative position of the element to the component (for example, from the publication "*Neue TUCKER-Technologie. Bolzenschweißen mit System*," Emhart Tucker, September 1999). The support foot is aligned approximately parallel to the welding head holder. In an initial position, the element held in the holder projects somewhat beyond the support foot. In order to determine the relative position, the welding head is made to approach the component. During this process, the element contacts the component first. The welding head is advanced further until the support foot contacts the component. In this process, the holder is displaced relative to the welding head in opposition to an elastic preloading force. As a result, the relative position of the element to the component can be determined by means of a suitable measurement system and the rigid connection between the support foot and the welding head.

Alternatively, so-called footless measurement systems are also known for determining the relative position of the element to component. Thus, U.S. Pat. No. 5,252,802 discloses a stud welding apparatus with a housing designed as a gun. A positioning motor first brings the housing into a position in which a stud is located in the vicinity of a component. Provided in the housing is a linear motor for the purpose of axially moving a shaft that carries the stud. A position measurement system is provided to control the linear motor. To determine the relative position of the stud and the workpiece, the linear motor is actuated so as to move the stud toward the workpiece at a specific speed. As soon as the stud touches the workpiece, an electrical contact closes. In addition, it is known from WO 96/11767 to elastically preload the stud holder in the direction of the workpiece and to move it axially against the preloading by means of a linear motor. Finally, WO 96/05015 discloses a stud welding apparatus with no support foot, wherein a welding head can be moved as a whole by means of a positioning drive. Provided on the welding head is a holder that holds a stud. A positioning device serves to move the holder axially relative to the welding head. The positioning device can be a servo-pneumatic or servo-hydraulic working cylinder. The relative position of the holder to the welding head is determined by means of a position measurement system.

In order to determine a zero position between the stud and the workpiece, the welding head is moved to an end position in the direction of the workpiece. In the course of this movement, the stud contacts the workpiece. Because from this point on the stud can no longer follow the motion of the welding head, the holder is then displaced relative to the welding head in opposition to the pressing motion. This displacement is measured by the position measurement system with the result that the final position of the welding head is determined precisely.

With the above in mind, an object of the present invention is to specify an improved short-cycle arc welding system and method for short-cycle arc welding. This object is achieved in the aforementioned short-cycle arc welding system in that the measurement system is additionally designed to determine the relative position of the element to the component without any contact between the foot and the component, and in that the measurement system has means to move the foot from an operating position to a rest position in which the foot is inactive.

In the aforementioned short-cycle arc welding method, the object is achieved in that the method uses a short-cycle arc welding system that has a control unit in which is stored, for a plurality of automatic welding processes, information on whether determination of the relative position of the element to the component should take place in a given welding process with or without a foot that is designed to contact the component, and further wherein the method has the following steps:

a) operating a robot with an arm such that a welding head attached to the arm reaches a welding position for a selected welding process, b) establishing whether the selected welding process requires the relative position of the element to the component to be determined with or without the foot, c) determining the relative position of the element to the component as a function of the conclusion reached in step b), and d) carrying out the selected welding process.

With the invention, it is possible to determine the relative position of the element to the component with or without a foot or support foot. Generally, the relative position is determined without a support foot in weld locations where the component is relatively stable. This has the advantage that the welding stud can be welded especially close to contours since more space is available that is not occupied by a support foot. The higher stiffness in corners and at folds etc. also makes it possible to do without a support foot.

In contrast, when a welding process is to be carried out on a relatively unstable component, for example unsupported thin sheet metal, it is preferred to determine the relative position of the element to the component with a support foot. In such a case, the foot provides a type of "bracing" of the component relative to the welding head. As a result, the component cannot deflect. In such a case, the relative instability of the component could result in incorrect measurements if the relative position is determined without using the support foot. The object is attained in full in this way.

It is particularly advantageous for the measurement system to be designed to determine the relative position of the element to the component without contact between the foot and the component in that the point when the element contacts the component is measured when the element approaches the component. In general, this embodiment permits especially rapid determination of the relative position. In this context, it is particularly advantageous for the contact between the element and the component to be measured electrically. This measurement can, for example, be accomplished in that the rise of the motor current in an electric motor that is used to move the element toward the component is measured. Alternatively, a voltage could also be applied between the element and the component. The collapse of this voltage to zero then indicates that the element has contacted the component electrically and consequently also mechanically.

In an alternative embodiment, the contact between the element and the component is measured in that, while the welding head approaches the component, the element is displaced relative to the welding head after contact with the component and the relative position of the element to the welding head is measured. This embodiment corresponds to the method disclosed in the aforementioned WO 96/05015.

It is advantageous overall for a control unit to be provided in which is stored, for a plurality of automatic welding processes, information on whether determination of the relative position of the element to the component should take place with or without a foot in each welding process. In this way, determination of the relative position with or without the foot can be performed on a case-by-case basis when a plurality of welding processes are performed one after another by a robot. Prior to each welding process, the foot is moved, either to its operating position or to its rest position. This can even take place during movement of the welding head from one weld point to a next weld point by the robot, for example.

In another preferred embodiment, the welding head has elastic means for preloading the holder in an actuating direction. As a result, the linear motion device for advancing and retracting the holder can be left de-energized in most operating states. The result is low energy consumption. In accordance with a preferred embodiment, the elastic means preload the holder in the retracting direction. When the linear motion device is operated in the advancing direction in order to determine the relative position of the component to the element without a foot, the holder in its elastically preloaded rest position is always in the correct initial position. Thus, especially low energy consumption is achieved on the whole. Moreover, under certain conditions, higher speeds can be achieved than in other embodiments.

In an alternative embodiment, the elastic means preload the holder in the advancing direction. In this embodiment, a higher speed can be achieved in the advancing direction in the actual welding process. In the event of preloading in the retracting direction, the holder must be extended against the preloading during determination of the relative position with the support foot, either before or after the support foot has mechanically contacted the component. With preloading in the advancing direction, active movement of the holder by means of the linear motion device is not absolutely necessary when determining the relative position using the support foot.

In another preferred embodiment, the measurement system has a position sensor that measures the position of the holder relative to the welding head. Of course, the features mentioned above and those explained below can be used not only in the combinations specified, but also in other combinations or by themselves without exceeding the scope of the present invention.

BRIEF DESCRIPTION OF THE DRAWINGS

Example embodiments of the invention are shown in the drawings and are explained in detail in the description below. Shown are.

DETAILED DESCRIPTION

Figure 1:
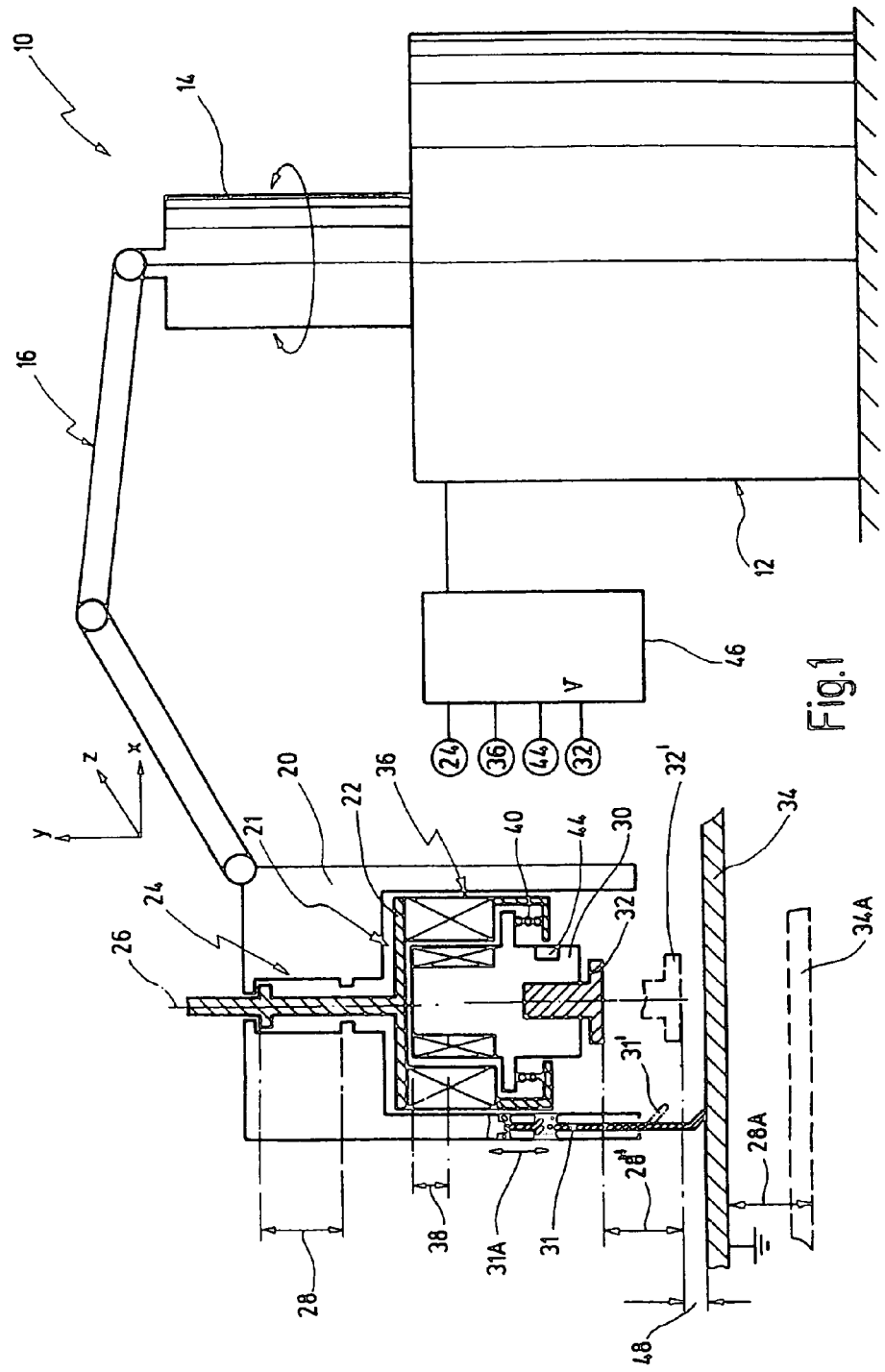
FIG. 1 a schematic view of a first embodiment of a short-cycle arc welding system in accordance with the invention.

In FIG. 1, a first embodiment of a short-cycle arc welding system in accordance with the invention is labeled 10 overall. The short-cycle arc welding system 10, which hereinafter is referred to in abbreviated form as stud welding system 10, includes a robot 12. The robot 12 has a turret 14, by which means a single-jointed or multiple-jointed arm 16 can be rotated. The robot 12 as a whole is designed to move the end of the arm freely in three coordinate axes x, y, z. A welding head base 20 is attached to the end of the robot arm 16. The welding head base 20 supports a carriage 21 that can be moved back and forth along an axis 26 relative to the welding head base 20. A welding head 22 is mounted on the carriage 21. A pneumatic arrangement 24 serves to move the welding head 22 back and forth with respect to the welding head base 20 by means of the carriage 21. The stroke through which the pneumatic arrangement 24 can move the welding head 22 with respect to the welding head base 20 is labeled 28. The welding head 22 has a holder 30 that is designed to releasably hold a metal element such as a stud 32. To this end, the holder 30 has appropriate clamping means that are not shown in detail in FIG. 1. FIG. 1 also shows a metal component, such as a metal sheet 34, that is oriented essentially perpendicular to the axis 26.

In addition, a support foot 31 is provided on the welding head base 20. The support foot 31 can be moved back and forth in an axial direction between an operating position shown in solid lines in FIG. 1 and a rest position labeled 31'. A displacement mechanism that is schematically indicated in FIG. 1 as 31A is provided for this purpose. As an alternative to a movable mounting of the support foot 31 on the welding head base 20, the support foot 31 could also be mounted directly on the welding head 22 in an appropriately movable fashion.

The welding head 22 also has a linear motion device 36 that is comprised of a linear motor, more particularly a linear electric motor. The linear motion device 36 serves to move the holder 30 relative to the welding head 22 in an axial direction that is aligned parallel to the axis 26. The linear motion device 30 has a stroke 38 that can, for example, be in the range from 8 mm to 20 mm, more particularly in the range from 10 mm to 15 mm. In comparison, the stroke 28 of the pneumatic arrangement 24 can be in the range from 2 cm to 10 cm, more particularly in the range from 4 cm to 6 cm. Moreover, the holder 30 is preloaded in the direction away from the component 34 relative to the welding head 22, which is to say in the retracting direction, by means of a compression spring 40. The compression spring 40 engages the welding head 22 or the movable part of the carriage 21 on one and, and the holder 30 on the other end.

The welding head 22 also has a position sensor 44 that is merely indicated schematically in FIG. 1. The position sensor 44 serves to measure the relative position of the holder 30 to the welding head 22. To this end, the position sensor 44 can have a code reader on the holder 30 that reads a linear coding on the welding head 22. In addition, a control unit 46 is provided. The control unit 46 is connected to the robot 12, and also to the pneumatic arrangement 24, the linear motion device 36 and the position sensor 44. The control unit 46 serves to operate the movable elements of the stud welding system 10 in a coordinated manner, and to control their movement, speed and/or acceleration on the basis of the signals from the position sensor 44. Moreover, as is described below, the control unit 46 serves to determine the relative position of the element 32 to the component 34 prior to a welding process. The welding system 10 is designed to determine the relative position of the element 32 to the component 34 alternately using the support foot 31 in its operating position and not using the support foot 31 (which is then in the rest position 31').

For the case of determining the relative position with the support foot 31, the welding head 22 generally is brought closer to the component 34 by means of the carriage 21 until the end of the support foot 31 contacts the component 34. Since the holder 30 in this embodiment is preloaded in retraction, the element 32 is located in the position shown at 32' after the component 34 is contacted by the support foot 31. Subsequently, the linear motion device 36 is actuated until the element 32 contacts the component 34. As a result of the fixed positional relationship between the element 34, the support foot 31, the welding head base 20, the welding head 22 and the holder 30, the relative position of the element 32 to the element 34 can be established unambiguously. Alternatively, it is also possible to operate the linear motion device 36 prior to moving the support foot 31 toward the component 34 in such a way that the element 32 projects beyond the support foot 31 in the axial direction. In this case, after initial contact with the component 34 by the element 32, the approach continues, displacing the linear motion device 36, until the support foot 31 contacts the component 34. In the alternate method of determining the relative position of the element 32 and the component 34, the support foot 31 is moved to the rest position 31' and is not used. In this method, the relative position is determined as follows, for example. First, the control unit 46 is electrically connected to the stud 32 by means of lines that are not shown. In addition, it is indicated in FIG. 1 that the control unit 46 is capable of applying a measurement voltage V to the stud 32. The component 34 can be grounded, for example, such a suitable current measurement device can be used to determine when the element 32 electrically contacts the component 34. First, the robot 12 is operated to bring the welding head base 20 into a base welding position, which is shown in FIG. 1, by means of the turret 14 and the robot arm 16. In this position, the welding head base 20 is located a certain distance above the component 34, wherein the axis 26 is perpendicular to the desired welding position of the component 34.

Subsequently, the pneumatic arrangement 24 is actuated so that the welding head 22 is extended toward the component 34, specifically by the full stroke 28, into a head welding position. The end position of the element 32 is shown in FIG. 1 at 32'. In this context, the element 32' is located a distance 48 from the component 34 that is shorter than the maximum stroke 38 of the linear motion device 36. Then the linear motion device 36 is actuated such that the element 32 is moved toward the component 34 until it contacts the component 34. This movement preferably takes place at a constant speed. During the process, the distance traveled is measured by the position sensor 44. As soon as the element 32 contacts the component 34, an electric circuit originating at the measurement voltage V is closed. This is detected by the control unit 46, and the linear motion device 36 is stopped. In addition, the contact position of element 32 and component 34 that is present at this point in time is used as the "zero position" for the further welding process. Consequently, the exact relative position of element 32 to component 34 is known throughout the entire welding process that follows by means of the position sensor 44. As a result, the welding process can take place independently of any existing tolerances in positioning by the robot 12 or by the pneumatic arrangement 24 with the desired positional relationship between the element 32 and the component 34.

The actual stud welding process is accomplished in a manner that is known per se. In this context, a pilot current is applied to the element 32 after disconnection of the measurement voltage V. Then the element 32 is raised relative to the component 34 so that an arc is drawn. After a certain height has been reached, the actual welding current is switched on, which raises the energy of the arc such that the end face of the element 32 and the associated location on the component 34 melt. Afterward, the linear motion device 36 again advances the element 32 toward the component. As soon as electrical contact has been made again, the arc is short-circuited and the welding current is switched off. In general, the advancing step takes place somewhat below the surface of component 34 so that good mixing of the molten materials on both sides takes place. Then all the molten material solidifies and the actual welding process is concluded. The holder releases the element 32. Then the linear motion device 36 is switched off. The holder 30 is consequently returned to the retracted rest position by the spring 40. Furthermore, after this or at the same time, the pneumatic arrangement 24 is operated by the control unit 46 in such a way that the welding head 22 again reaches the retracted initial position.

Figure 2:
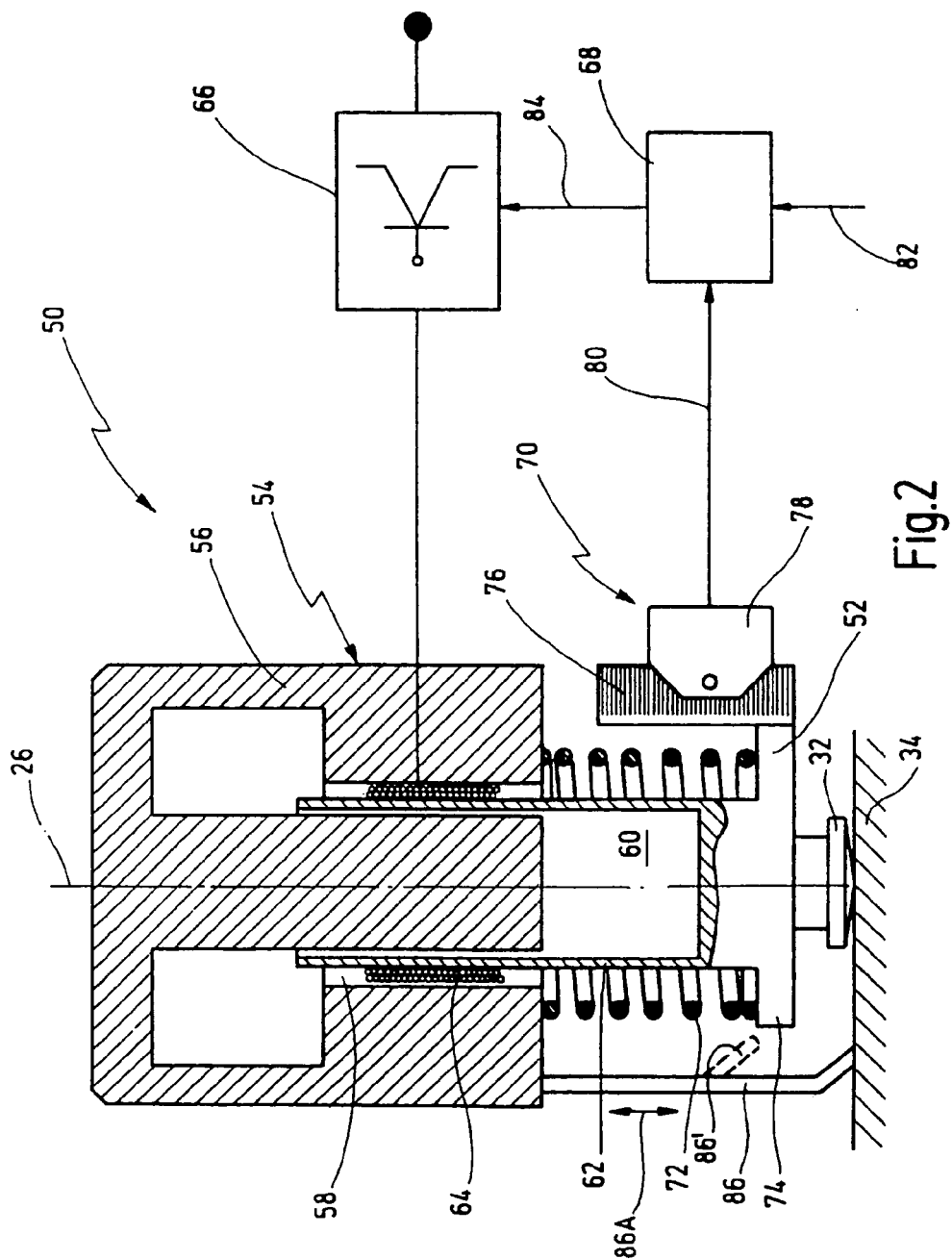
FIG. 2 a schematic representation of a welding head of an alternative embodiment of a short-cycle arc welding system in accordance with the invention.

In FIG. 2, an alternative embodiment of a welding head is labeled 50 overall. The welding head 50 can be mounted instead of the welding head 22 on a welding head base 20 by means of a carriage 21 or without a carriage. In other respects as well, the structure and operation of a stud welding system with the welding head 50 can be identical to the structure of the stud welding system 10 from FIG. 1. Consequently, for this second embodiment, reference is made to the description of the stud welding system 10, and only the differences are explained below. The welding head 50 has a holder 52 for one element 32 at a time and also has a linear motion device 54. The linear motion device 54 serves to move the holder 52 toward an axis 26 relative to the welding head 50 in order to advance the element 32 toward or retract it from the component 34. The linear motion device 54 has a permanent magnet 56 which contains a circular hole 58.

The holder 52 has a blind hole 60 that is matched to the circular hole 58 such that an end of the holder 52 facing away from the component 34 forms a sleeve section 62 that is introduced into the circular hole 58. A coil 64 is formed on the outer circumference of the sleeve section 62. The coil 64 is connected to a power supply 66 which in turn is operated by a control unit 68, for example via pulse width modulation. Moreover, a position sensor 70 is provided which measures the position of the holder 52 relative to the welding head 50. A compression spring 72 is arranged between the permanent magnet 56 and a flange 74 of the holder 52 which projects on the component side. The compression spring 72 preloads the holder 52 in a rest position, and in contrast to the embodiment in FIG. 1 the rest position lies in the advancing direction so that the holder 52 is maximally extended relative to the welding head 50 in the rest position. By excitation of the coil 64, the holder 52 can be retracted into the welding head 50 relative to this rest position against the preloading of the compression spring 72. In this process, a code reader 78 that is rigidly attached to the welding head 50 passes over a linear coding 76 on the holder 52. The code reader 78 thus provides an actual position signal 80 to the control unit 68. The control unit 68 compares the actual signal 80 with a target signal 82 and outputs a positioning signal 84 to the power supply 66. Naturally, an appropriate regulator is therefore present in the control unit 68.

Also shown in FIG. 2 is that a support foot 86 is mounted on the welding head 50. In similar fashion to the support foot 31 in FIG. 1, the support foot 86 can be moved back and forth in the axial direction between an operating position shown in FIG. 2 and a rest position 86' by a displacement mechanism 86A. In this embodiment as well, the relative position of the element 32 to the component 34 can be determined either with the support foot 86 or without the support foot 86. When the relative position is determined with the support foot 86, said foot is in the operating position. Before the welding head 50 approaches the element 34, the linear motion device 54 is in the initial position, in which the holder 52 is maximally extended relative to the welding head 50. In this position, the held element 32 extends a little ahead of the support foot 86 such that the component 34 is first contacted by the element 32 as described above. As the process continues, the linear motion device 54 is retracted until the support foot 86 contacts the component 34.

When the relative position is determined without the support foot 86, said foot is in the rest position 86'. The position determination can then be performed in that the holder is first retracted fully by means of the linear motion device. Further operation is then identical to the operation described above for the embodiment in FIG. 1. Alternatively, it is also possible to have the welding head 50 approach the element 34 with the holder 52 maximally extended. Determination of the relative position can then take place as described in the aforementioned WO 96/05105, for example.

In both embodiments, the element 32 can approach the component 34 with high speed and high precision. It is then preferable for the combination of control unit 46 or 68, position sensor 44 or 70, and linear motion device 36 or 54 to be used with or without the support foot 31 or 86 to determine the relative position of the element 32 to the component 34. Consequently, sequential welding operations can be executed with uniformly high quality, independent of the precision of the positioning of the welding head 22 or 50. As already mentioned, the determination of the relative position without support foot 31 or 86 is preferred.

However, insofar as the component 34 is elastic or elastically mounted, determination of relative position with the support foot 31 or 86 is more favorable, since in this case a type of "bracing" takes place between the component and the welding head 20 or 50, as is described above. Information is normally stored in the control unit 46 or 68 for each welding operation as to whether it is to be performed with or without the support foot 31 or 86. Based on this information, the support foot 31 or 86 is moved either to the operating position or the rest position 31' or 86' before a welding operation.

Yet another alternative embodiment is indicated by dashed lines in FIG. 1, wherein the component 34A can be positioned along a stroke 28A by means of a schematically indicated positioning device. This embodiment represents an alternative to the arrangement of a carriage 21 on the welding head base 20. As a result, if such a positioning device for the component 34A is present it is easier to rigidly attach the welding head to the welding head base 20. Moreover, in some cases, it may suffice to move the end of the robot arm directly; hence, with no carriage 21 or movable component, into a position such that the element 32 is in the close position labeled 32' in FIG. 1. In particular, this is the case when the holder 30 or 52 is elastically preloaded in a rest position with respect to the welding head 22 or 50 by elastic means such as the spring 40 or 72. In an alternative embodiment, the robot 12 and the carriage 21 can also be replaced by a simple automatically controlled linear guide.

What is claimed is:

1. A welding system for welding an element to a component, the system comprising:
  (a) a welding head operably welding the element to the component;

(b) a support foot mounted on the welding head, operably movable in an axial direction between an operating position and a rest position;
(c) a measurer operably measuring a relative position of the component to the element; and
(d) a controller operably determining the relative position of the component relative to the element and commencing the welding of the element to the component.

2. The system according to claim 1, further comprising a holder operably holding the element in the welding head.

3. The system according to claim 2, further comprising a linear motion device operably advancing and retracting the holder.

4. The system according to claim 2, further comprising a position sensor operably measuring the position of the holder relative to the component.

5. The system according to claim 1, wherein the controller determines the relative position when the element makes contact with the component.

6. The system according to claim 5, wherein the measurer electrically measures the relative position.

7. The system according to claim 5, wherein the welding head retracts the element at the contact.

8. The system according to claim 1, wherein the element is a metal stud and the component is a metal sheet.

9. The system according to claim 8, wherein the metal stud and the metal sheet are parts of a motor vehicle.

10. The system according to claim 1, wherein the controller determines the relative position with the foot in the operating position.

11. The system according to claim 1, wherein the controller determines the relative position with the foot in the rest position.

12. The system according to claim 1, further comprising a plurality of welding routines stored in the controller determining the relative position of the component to the element and determining a support foot position during a welding process.

13. The system according to claim 1, further comprising a robotic arm attached to the welding head.

14. The system according to claim 13, wherein the robotic arm moves in at least one coordinate axis.

15. The system according to claim 1, further comprising a plurality of welding heads.

16. A welding apparatus comprising:
(a) a welding head;
(b) a movable foot mounted to the welding head;
(c) the movable foot operably movable from a rest position to an operable position;
(d) a controller operably storing at least one welding routine;
(e) the controller operably controlling the welding head;
(f) the controller operably determining a movable foot position;
(g) a measurer operably measuring a relative distance; and
(h) the controller operably selecting the welding routine and commencing welding based on the welding routine.

17. The apparatus according to claim 16, wherein the element and the component are parts of a motor vehicle.

18. The apparatus according to claim 16, further comprising the measuring of the relative distance when there is a physical contact between the element and the component.

19. The apparatus according to claim 16, further comprising the measuring of the relative distance when there is an electrical contact between the element and the component.

20. The apparatus according to claim 16, wherein the controller determines whether the movable foot is in an operation or a rest position.

21. A method for welding an element to a component using a welder comprising a movable foot, the method comprising:
(a) storing a plurality of welding routines in the controller;
(b) moving a welding head to a location as determined by one of the plurality of welding routines;
(c) determining whether the movable foot is in an operable position or a rest position;
(d) measuring a position of the element relative to the component; and
(e) welding the element to the component as determined by the one of the plurality of welding routines.

22. The method according to claim 21, further comprising measuring the position on physical contact of the element to the component.

23. The method according to claim 21, further comprising measuring the position on electrical contact of the element to the component.

24. The method according to claim 21, further comprising holding the element.

25. The method according to claim 24, further comprising lowering and releasing the element.

26. The method according to claim 21, further comprising operating a robotic arm operably moving the welding head.

27. The method according to claim 21, further comprising controlling at least one of the group select from welding head location, element lowering speed, arc voltage, robotic arm movement, and element position relative to the component.

28. The method according to the claim 27, wherein the controlling is accomplished by employing at least one of the plurality of welding routines in the controller.

29. The method according to claim 28, further comprising loading the element into the welding head.

* * * * *